(12) United States Patent
Lee

(10) Patent No.: US 6,370,645 B1
(45) Date of Patent: Apr. 9, 2002

(54) METHOD OF CONSTRUCTING A HARD DISK DRIVE HAVING UPLOADABLE/DOWNLOADABLE FIRMWARE

(75) Inventor: Jae-Sung Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/249,483

(22) Filed: Feb. 12, 1999

(30) Foreign Application Priority Data

Feb. 20, 1998 (KR) ............................................ 98-5445

(51) Int. Cl.⁷ ................................................. G06F 9/24
(52) U.S. Cl. .......................................... 713/2; 711/112
(58) Field of Search ............................... 713/2; 711/112

(56) References Cited

U.S. PATENT DOCUMENTS

| | | | |
|---|---|---|---|
| 4,669,004 A | * 5/1987 | Moon et al. ................... | 360/53 |
| 5,022,077 A | * 6/1991 | Bealkowski et al. ......... | 711/163 |
| 5,623,604 A | 4/1997 | Russell et al. ................. | 717/11 |
| 5,781,921 A | 7/1998 | Nichols ....................... | 711/115 |
| 5,826,075 A | 10/1998 | Bealkowski et al. ......... | 713/187 |
| 5,850,562 A | 12/1998 | Crump et al. ................... | 713/1 |
| 5,864,698 A | 1/1999 | Krau et al. ..................... | 713/2 |
| 6,031,684 A | * 2/2000 | Gregg ...................... | 360/78.06 |

* cited by examiner

*Primary Examiner*—David L. Robertson
(74) *Attorney, Agent, or Firm*—Robert E. Bushnell, Esq.

(57) ABSTRACT

A method of constructing firmware of a HDD which is capable of uploading code data written in a hard disk to a memory or downloading the code data from the memory to the hard disk. Codes needed to operate the HDD are stored in a prescribed area of a disk. A hard disk drive boot code and a servo core code are stored in a flash ROM of prescribed capacity. The codes stored in the disk is uploaded to a RAM of prescribed capacity by using the codes stored in the flash ROM, thus to implement the actual operation of the HDD.

14 Claims, 2 Drawing Sheets

METHOD OF CONSTRUCTING A HARD DISK DRIVE HAVING UPLOADABLE/DOWNLOADABLE FIRMWARE

CLAIM OF PRIORITY

This application makes reference to, incorporates the same herein, and claims all benefits accruing under 35 U.S.C §119 from an application entitled Method Of Constructing Uploadable/Downloadable Firmware Of Hard Disk Drive earlier filed in the Korean Industrial Property Office on Feb. 20, 1998, and there duly assigned Ser. No. 98-5445 by that Office.

BACKGROUND OF THE INVENTION

1. Field of the Invention

The present invention relates to a hard disk drive (HDD), and more particularly, to a method of constructing firmware of a HDD which is capable of uploading code data written in a hard disk to a memory or downloading the code data from the memory to the hard disk.

2. Description of the Related Art

A HDD, a magnetic disk storage medium, has been widely used as an auxiliary memory of a computer system by virtue of its high speed operation and its large capacity. The HDD has a processor for controlling data writing or reading operation, and the processor controls the circuit and mechanical parts of the HDD by using firmware written in a storage medium.

The HDD uses firmware for driving the circuit and mechanical parts thereof. Firmware is programming that is inserted into a PROM, and is created and tested like software (using microcode simulation). When ready, it can be distributed like other software and, using a special interface, installed in the PROM by the user. The firmware is stored in the PROM for accessing data under the control of a microprocessor. The PROM can store data of about 64 kilo (K) words, i.e., kilobytes. The firmware is broadly divided into an interface module, a disk module, a test module, and a servo module. The firmware tests or initializes a computer when the computer is powered on and offers a basic function used for operating system's interacting with the user and the HDD. The firmware is programmed using C language or assembler language and stored in the PROM in a binary or hexadecimal form.

The firmware has a program bug, however, in that it is not easy to debug the firmware stored in the PROM. For example, in order to upgrade the firmware, the PROM would be replaced. If it is demanded that the firmware should be changed in relation to the process test, reliability and compatibility of the HDD, it is difficult to appropriately cope with such a situation. Since the PROM can not be changed once it is written, it can not rapidly satisfy the demand for altering the codes. If a serious problem happens during operation of the HDD, the PROM should be replaced with another one. Although a flash ROM may be used instead of the PROM, it is more expensive than the PROM.

Incorporated herein by reference are the following patents which discuss various methods of updating firmware to a PROM or flash PROM: U.S. Pat. No. 5,623,604 to William C. Russell et al. entitled Method And apparatus For Remotely Altering Programmable Firmware Stored In An Interactive NetworkBoard Coupled To A NetworkPeripheral; U.S. Pat. No. 5,781,921 to Robert A. Nichols entitled Method And Apparatus To Effect Firmware Upgrades Using A Removable Memory Device Under Software Control; U.S. Pat. No. 5,826,075 to Richard Bealkowski et al. entitled Automated Programmable Firmware Store For A Personal Computer System; U.S. Pat. No. 5,850,562 to Dwayne Thomas Crump et al. entitled Personal Computer Apparatus And Method For Monitoring Memory Locations States For Facilitating Debugging Of POST And BIOS Code; and U.S. Pat. No. 5,864,698 to Michael Paul Krau et al. entitled Disk Based BIOS.

SUMMARY OF THE INVENTION

It is therefore an object of the present invention to provide a method of constructing firmware of a HDD which is capable of downloading firmware information to a hard disk and uploading the firmware information to a semiconductor memory.

It is another object of the present invention to provide a method of constructing firmware which can easily correct a bug and can appropriately cope with the demand for upgrading in relation to the process test, reliability and compatibility of a HDD.

In accordance with an aspect of the present invention, there is provided a method of constructing firmware of a hard disk drive having a disk as a storage medium consisting of a data band in which user data is written and a plurality of protecting bands. The method includes the steps of: storing codes needed to operate the hard disk drive in a prescribed area of the disk; storing a hard disk drive boot code and a servo core code in a flash read only memory of prescribed capacity; and uploading the codes stored in the disk to a random access memory of prescribed capacity by using the codes stored in the flash read only memory, thus to implement the actual operation of the hard disk drive.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, only parts needed to understand operation according to the present invention will be described and other details are omitted so as not to obscure the subject matter of the present invention.

Figure 1:
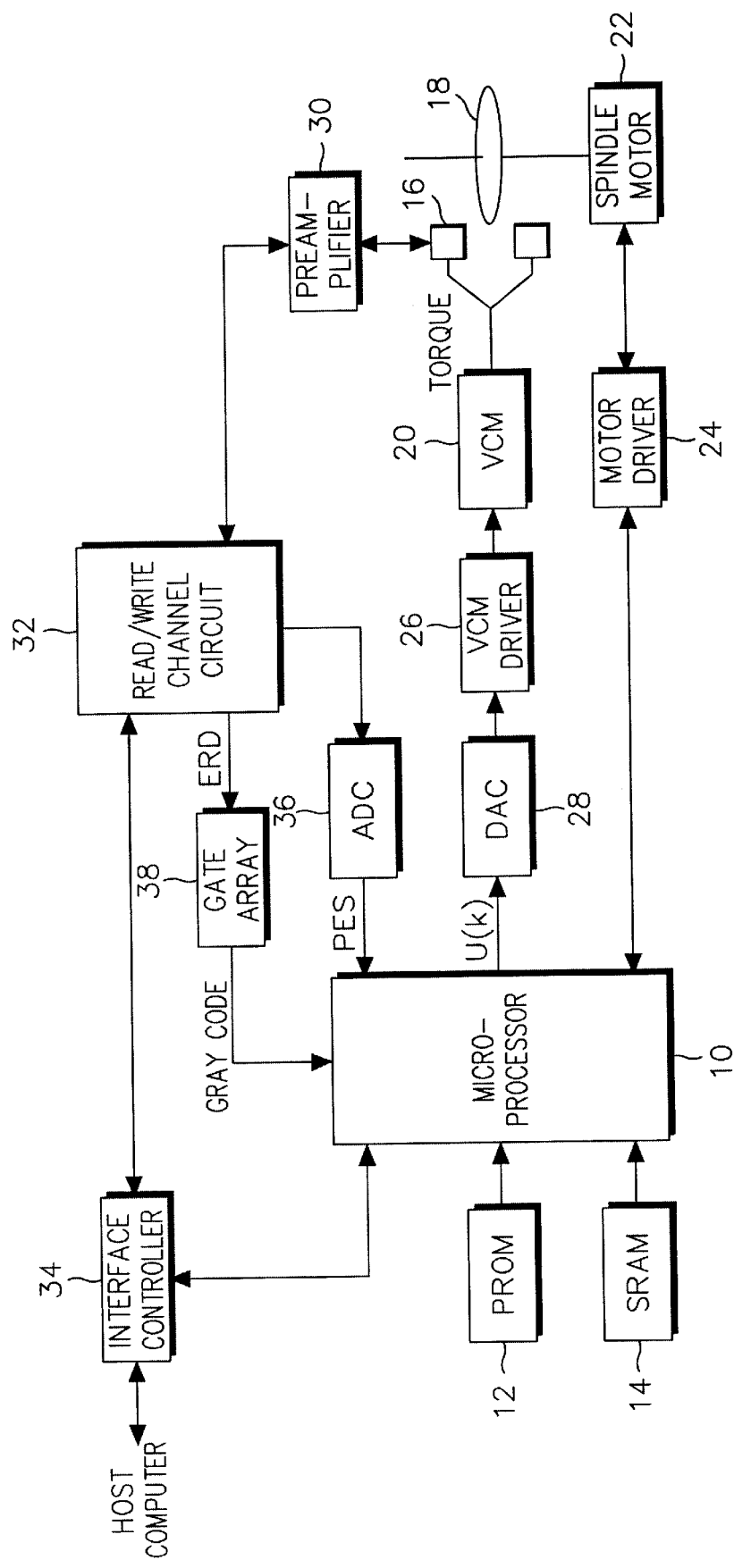
FIG. 1 is a schematic block diagram of a hard disk drive.

A schematic block diagram of the hard disk drive (HDD) is shown in FIG. 1. Referring to FIG. 1, a microprocessor 10 is connected to a programmable read only memory (PROM) for storing a control program and data necessary for controlling the HDD and to a static random access memory (SRAM) 14. The microprocessor 10 controls the overall operation of the HDD according to data stored in the PROM 12 and the SRAM 14. A head 16 fixed to one end of an actuator (not shown) moves horizontally over a disk 18 to write data thereon or read data therefrom. A voice coil motor (VCM) 20 situated at the other end of the actuator horizontally shifts the head 16 over the disk 18 according to the direction and level of driving current applied to its input terminal. A spindle motor 22 rotates the disk 18 fixed to a driving axle at a speed corresponding to a control signal supplied from a motor driver 24. A VCM driver 26 connected to the VCM 20 controls driving of the VCM 20. A digital-to-analog converter (DAC) 28 converts a digital control signal U(k) generated from the microprocessor 10 into an analog signal and supplies the converted analog signal to the VCM driver 26. The motor driver 24 connected between the spindle motor 22 and the microprocessor 10 drives the spindle motor 22 under the control of the microprocessor 10. A preamplifier 30 amplifies a read signal picked up by the head 16 and amplifies an input write signal. The amplified write signal is supplied to the head 16. A read/write channel circuit 32 encodes write data transmitted from an interface controller 34 and supplies the encoded data to the preamplifier 30. The read/write channel circuit 32 also converts an analog read signal generated from the preamplifier 30 into a digital signal, and generates the digital signal as encoded read data (ERD). An analog-to-digital converter (ADC) 36 connected to the read/write channel circuit 32 converts a received analog servo read signal into a position error signal (PES) of a digital value. The PES is supplied to the microprocessor 10. A gate array 38 receives the ERD and detects servo information such as a Gray code within a servo area of the disk 18. The interface controller 34 interfaces data among an external data input device (e.g., a host computer), the microprocessor 10 and the disk 18.

Figure 2:
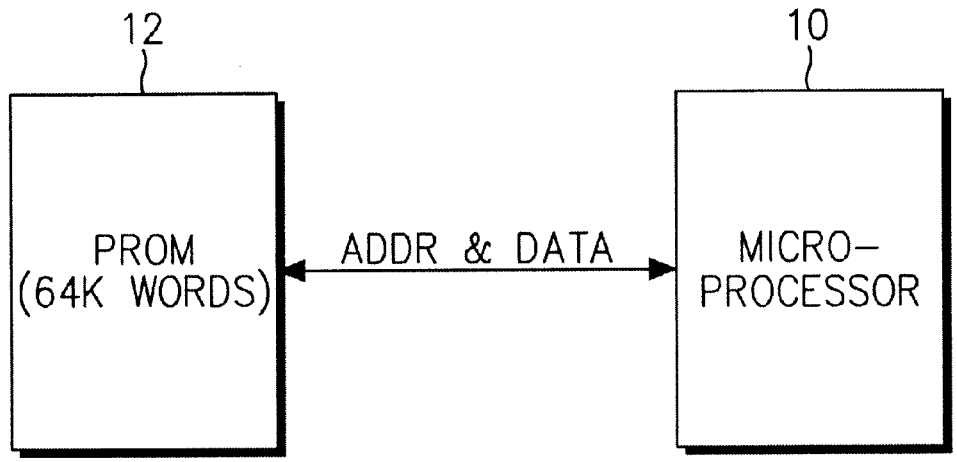
FIG. 2 illustrates a connection relationship between a PROM and a microprocessor shown in FIG. 1.

FIG. 2 illustrates the connection between the PROM 12 and the microprocessor 10. The firmware is stored in the PROM 12 for accessing data under the control of the microprocessor 10. The PROM 12 can store data of about 64 K-bytes. The firmware is broadly divided into an interface module, a disk module, a test module, and a servo module. The firmware tests or initializes a computer when the computer is powered on and offers a basic function used for operating system's interacting with the user and the HDD. The firmware is programmed using the C language or assembler language and stored in the PROM 12 in a binary or hexadecimal form.

Figure 3:
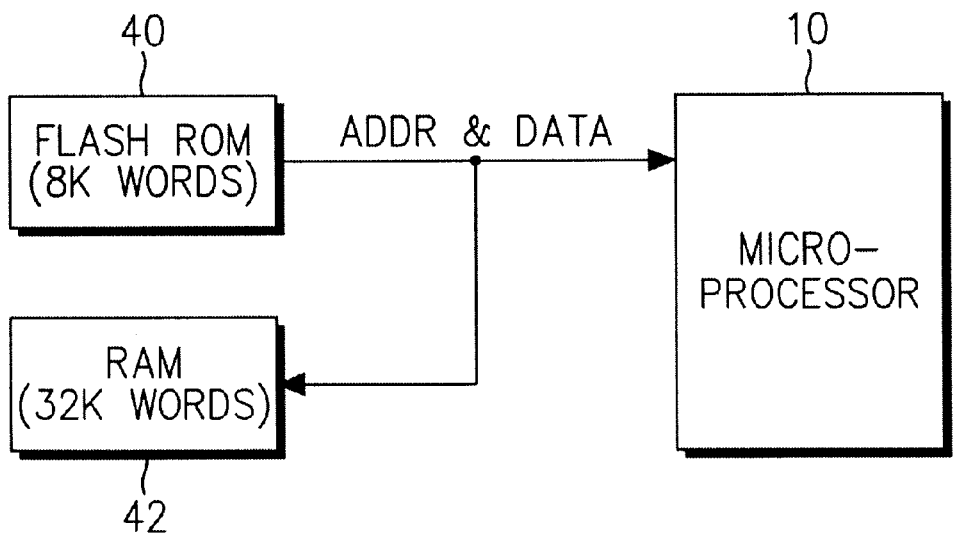
FIG. 3 illustrates a connection relationship between a flash ROM, a RAM and a microprocessor constructed to upload/download firmware information of a hard disk drive according to a preferred embodiment of the present invention.

FIG. 3 shows operations of downloading firmware information to a maintenance area of a hard disk and uploading the firmware information written in the maintenance area to a volatile memory by a boot code and a servo code stored in a writeable nonvolatile memory.

Referring to FIG. 3, for a writeable nonvolatile memory, an 8 K-byte flash ROM 40 and a 32 K-byte RAM 42 are used, in the circuit of FIG. 1, instead of the 64 K-byte PROM 12 of FIG. 2. The flash ROM 40 stores a HDD boot code and a servo core code. The RAM 42 temporarily stores interface, disk and test codes. The HDD boot code stored in the flash ROM 40 includes a minimum initialization code for uploading data of an area in which an operation code of the HDD is stored to the RAM 42 by unlatching the head 16 and causing the head 16 to seek a maintenance track on the disk 18, and includes simple read and write operation codes used respectively for uploading and downloading. Although the maintenance track on the hard disk 18 is used to exchange a defect sector for processing a defect on the disk 18 for a maintenance area sector, codes used to operate the HDD are written therein. The servo core code includes a head unlatch code, a track seek code for seeking the maintenance track, and a track following code for positioning the head to the center of the track.

The codes stored in the flash ROM 40 are relatively stabilized codes of minimum size and consist of only maintenance cylinder read/write codes which are not used for the operation of the HDD, so their contents are scarcely changed. However, it is possible to easily correct the contents of the codes since they are stored in the flash ROM 40. The total capacity of the codes is less than about 8 K words, and thus the flash ROM 40 with the small capacity may be used.

The codes stored in the flash ROM 40 are commands for uploading the codes actually used to operate the HDD, that is, the firmware stored in the maintenance area of the hard disk 18 to the RAM 42. These codes are accessed by the microprocessor 10. The codes to be uploaded, namely, the codes stored in the maintenance area of the hard disk 18 are written during a HDD fabricating process. In such a case, the codes are grouped into several segments each having size adequate to be completely uploaded to the RAM 42. For classification, the codes are divided into a main code and a test code each further divided into several segments. Therefore, the codes can be uploaded at any time, not only during the initial power-on of the HDD, but during the operation of the HDD. During a process test, only the test code is uploaded to the RAM 42. When the user is using the HDD, only the main code can be uploaded. Then since the codes are divided into structural modules, the correction and maintenance of the codes are easy and multiple functions are obtained even by the RAM of a small capacity. It will be appreciated to those skilled in the art that the RAM 42 may include a dynamic RAM or a static RAM.

In a user environment, if the HDD having the firmware uploading/downloading structure shown in FIG. 3 is initialized, the microprocessor 10 generates the control signal U(k) so that the head 16 may read a corresponding segment in the main code written in the maintenance area of the hard disk 18 by accessing the boot code and servo core code stored in the flash ROM 40, and simultaneously controls the motor driver 24. The microprocessor 10 analyzes the gray code generated from the gate array 38 and uploads the code of the corresponding segment to the RAM 42. Thereafter, the microprocessor 10 controls the circuit and mechanical parts of the HDD according to the code uploaded to the RAM 42.

As apparent from the foregoing description, most of the firmware is stored on the HDD and is constructed with the flash ROM and the RAM each having small capacity. The HDD boot code and the servo core code are stored in the flash ROM, and the interface, disk and test codes are stored in the RAM. The codes used for the operation of the HDD are stored in a prescribed area of the disk, so that the firmware bug can be corrected. The firmware according to the present invention can appropriately cope with the demand to change codes in relation to the process test, reliability and compatibility of the HDD, by controlling the writing and addressing of the data to the HDD to the appropriate maintenance area of the HDD. This can be accomplished using a floppy diskette or over a network system.

By maintaining the above described hard disk drive boot code and servo core code in the flash ROM, the present invention has the advantage over the U.S. Pat. No. 5,864,698 in that there is no need to reboot the computer system. Since there is no need to reboot the computer system, then there is no requirement to control the storing of the firmware data uploaded from the HDD to a specific storage area of the RAM.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of constructing a hard disk drive to upload or download firmware, said hard disk drive having a disk as a storage medium consisting of a data band in which user data is written and a plurality of protecting bands, said method comprising the steps of:

storing firmware codes, needed to operate said hard disk drive, in a prescribed area of said disk;

storing a hard disk drive boot code and a servo core code in a flash read only memory of prescribed capacity; and uploading said firmware codes stored in said disk to a random access memory of prescribed capacity by using said disk drive boot and servo core codes stored in said flash read only memory, thus to implement the actual operation of said hard disk drive.

2. The method as claimed in claim 1, wherein said hard disk drive boot code includes an initialization code of minimum size for uploading data of an area in which an operation code of said hard disk drive is stored to said random access memory by unlatching a head and causing said head to seek said prescribed area of said disk, and includes read and write operation codes used respectively for uploading and downloading.

3. A method as claimed in claim 1, wherein said servo core code includes a head unlatch code, a track seek code for seeking said prescribed area of said disk, and a track following code for positioning a head to the center of a track of said prescribed area.

4. The method as claimed in claim 1, wherein said prescribed area is a maintenance area of said disk.

5. The method as claimed in claim 1, wherein said codes needed to operate said hard disk drive are grouped into several segments each having size adequate to be uploaded to said random access memory.

6. A hard disk drive of a computer having uploadable firmware stored on a hard disk of said hard disk drive, comprising:

a first memory storing a hard disk drive boot code and a servo core code fore enabling firmware stored in a predetermined area of said hard disk to be uploaded to a second memory, said firmware being needed to operate said hard disk drive; and a microprocessor responsive to said hard disk drive boot code and said servo core code for controlling a head to read said firmware from said predetermined area of said hard disk and uploading said firmware for storage in said second memory, said microprocessor controlling said hard disk drive in response to said firmware uploaded to said second memory.

7. The hard disk drive as set forth in claim 6, wherein said first memory is a flash read only memory.

8. The hard disk drive as set forth in claim 6, wherein said second memory is a volatile memory.

9. The hard disk drive as set forth in claim 8, wherein said volatile memory is a random access memory for temporarily storing said firmware.

10. The hard disk drive as set forth in claim 6, wherein said hard disk drive boot code includes an initialization code.

11. The hard disk drive as set forth in claim 6, wherein said servo core code includes a head unlatch code, a track seek code for seeking said predetermined area of said hard disk, and a track following code for centering said head over said predetermined area of said hard disk.

12. The hard disk drive as set forth in claim 6, wherein said predetermined area of said hard disk is a maintenance track.

13. The hard disk drive as set forth in claim 11, wherein said predetermined area of said hard disk is a maintenance track.

14. The hard disk drive as set forth in claim 6, wherein said firmware is comprised of a main code to be uploaded for operating said hard disk drive and a test code to be uploaded during a process test of said hard disk drive, wherein each of said main code and said test code are divided into several easily up-gradable segments.

* * * * *